G. C. JENSEN.
LOCKING MEANS FOR LEVERS.
APPLICATION FILED MAR. 31, 1917.
1,235,035.
Patented July 31, 1917.
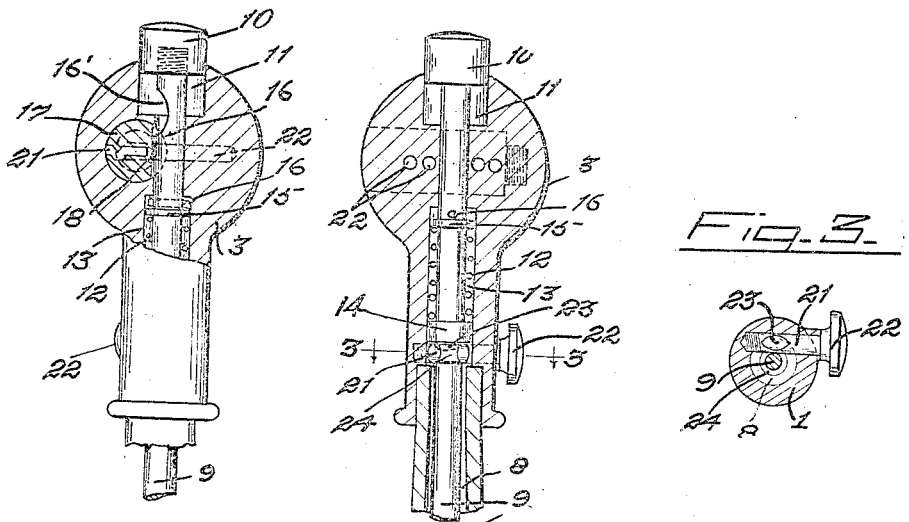
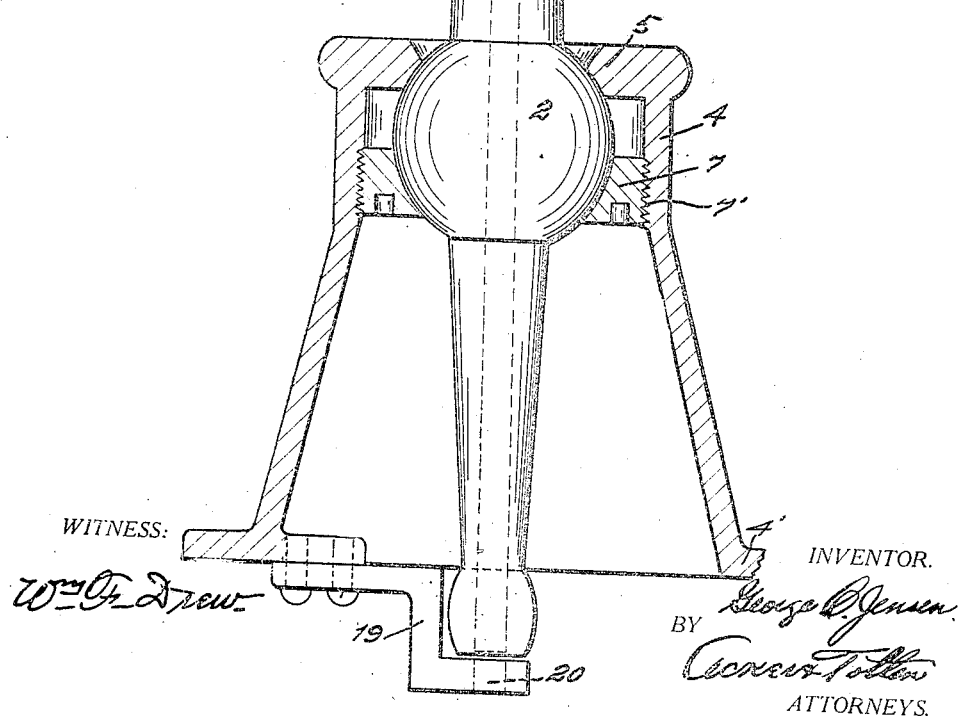
WITNESS:
Wm G. Drew
INVENTOR.
George C. Jensen
BY
ATTORNEYS.

UNITED STATES PATENT OFFICE.

GEORGE C. JENSEN, OF OAKLAND, CALIFORNIA.

LOCKING MEANS FOR LEVERS.

1,235,035.

Specification of Letters Patent.  Patented July 31, 1917.

Application filed March 31, 1917. Serial No. 158,872.

*To all whom it may concern:*

Be it known that I, GEORGE C. JENSEN, a citizen of the United States, residing at Oakland, in the county of Alameda and State of California, have invented certain new and useful Improvements in Locking Means for Levers, of which the following is a specification.

The present invention relates to locking devices for levers particularly for use in connection with that type of lever employed for use in shifting the movable speed power transmitting mechanism of a motor vehicle.

The invention has for its principal object to provide a construction particularly adapted for use in connection with the type of lever fulcrumed within its length for universal pivotal movement and by the employment of which a lever of this type is locked from operation and from removal from its fulcrum.

The invention consists primarily in a lineally movable locking member within the tubular lever and capable of projecting beyond the lower end thereof to engage a stationary member to lock the lever from operative movement.

To more fully comprehend the invention, reference is directed to the accompanying drawings, wherein—

Figure 1 is a view in elevation partly in section of the preferred embodiment of my invention.

Fig. 2 is a view in detail of the upper end of the lever illustrating the preferred form of locking mechanism.

Fig. 3 is a sectional view taken on line 3—3 of Fig. 1.

Referring more particularly to the several views of the drawings wherein like characters of reference designate corresponding parts, 1 indicates a suitable tubular lever of the type commonly employed in shifting the variable speed power transmitting mechanism of a motor vehicle and the same is formed intermediate of its length with a substantially spherical portion 2 and at its upper end with the handle portion 3. The lever is adapted to extend upwardly through a tubular fulcrum member 4 preferably in the upper surface of the cover 4′ for the shiftable power transmitting mechanism, not shown, and with the upper surface of the portion 2 in contact with the underside of the flange or surface 5 of the fulcrum member. The lever is retained in position within its fulcrum by a removable annular ring or member 7 received in the under portion of the fulcrum member 4 and preferably threaded therein as at 7′.

Lineally movable within the bore 8 in the lever 1 is a locking rod 9 of a length slightly greater than that of the lever and carrying at its upper end an operating button 10 adapted to be received in a recess 11 in the handle portion 3 of the lever when the locking rod is moved to operative position. A spring 12 coiled around the rod 9 within a chamber 13 in the lower end of the handle 3 and interposed between a collar 14 surrounding the lever and the washer 15 held in position by a pin 16, normally retains the locking rod 9 in its raised or inoperative position as in the drawings. The locking rod 9 is provided with the arcuate recess or depression 16′ in the face thereof, and disposed to coöperate with the same is a rotatably mounted locking barrel 17 arranged when in locking position to lie within the recess or depression 16′ and lock the rod from lineal movement within the lever. The barrel 17 is provided in line with said rod 9 with a recess or cut-out 18 which is adapted when the barrel is rotated to unlocked position, as in Fig. 2, to lie parallel with the rod 9 thus permitting a lineal movement of the rod within the lever.

When the lever is in neutral position the lower end thereof is adapted to lie directly over the outer end of a stationary member or arm 19 with the lower end of the rod 9 in alinement with a receiving opening 20 in the outer end of said arm, at which time the depression of the rod 9 will cause the lower end thereof to be seated in the opening 20 locking the lever from all operative movement. When in this position the barrel 17 is capable of being rotated to locking position to be received in the depression 16′, thus locking the rod 9 in its operative position. When it is desired to unlock the lever it is only required to insert a controlling key, not shown, in the slot 21 in the barrel which releases the retaining tumblers 22 permitting the rotation of the barrel to unlocked position at which time the spring 12 will automatically force the rod 9 upwardly within the lever and withdraw the lower end from the opening 20.

To prevent the accidental depressing of the rod 9 during the operating of the lever, due to the accidental depressing of the button 10, I provide a temporary retaining member or catch 21 rotatably mounted transversely of the lever and intersecting the bore 8 thereof, said member extending to a point exteriorly of the handle where it is provided with an engaging portion 22, enabling the same to be readily grasped for rotation. The member 21 is provided with a longitudinally disposed groove 23 adapted when the member is rotated to a certain position to register with one portion of an annular groove 24 in the rod 9, permitting free lineal movement of the rod. The rotating of the member 21 to a position as in Fig. 1, prevents accidental lineal movement of said rod 9.

By my improved construction I am enabled by a simple mechanism to efficiently lock the lever from operative movement and to also lock the same from removal from its fulcrum to prevent the operation of the shifting mechanism by means other than the lever.

Having thus described my invention, what I claim is—

1. In combination with a lever fulcrumed intermediate of its length for universal swinging movement and provided with an open ended bore extending lineally the full length thereof, a lineally movable locking rod within said bore and of a length greater than that of the lever, said rod when in raised position lying with its upper end above the upper end of said lever, a stationary locking arm provided with a recess lying below the lower end of said lever when the same is in neutral position and in which said locking rod is adapted to be received and have locked engagement when the lower end thereof is projected below the lower end of said lever by the manual depression of the upper end of said rod, means surrounding the rod for normally retaining the same in its raised position, said rod provided in its side wall with a recess, and a rotatable locking barrel within said lever and disposed at an angle to said rod for rotation to project into said cutout to retain the rod in locked engagement with said arm.

2. In combination with a tubular fulcrum member, a lever extending therethrough and provided intermediate of its length with a spherical portion fulcrumed therein for universal swinging movement and said lever formed with an open ended bore extending lineally the full length thereof, a lineally movable locking rod concealed within the bore in said lever and of a length greater than that of said lever, a stationary locking arm lying within said fulcrum member below the lower end of said lever and provided with a bore within which said locking rod is adapted to be received and have locked engagement when depressed with the lower end thereof projected beyond the lower end of said lever, said rod provided in its side wall with a recess, and a lock controlled barrel for reception in said recess when said rod is depressed for locking said lever from movement.

In testimony whereof I have signed my name to this specification in the presence of a subscribing witness.

GEORGE C. JENSEN.

Witness:
D. B. RICHARDS.